(12) United States Patent
Michail et al.

(10) Patent No.: US 7,770,182 B2
(45) Date of Patent: Aug. 3, 2010

(54) EVENT ROUTING MODEL FOR AN EXTENSIBLE EDITOR

(75) Inventors: Ashraf A. Michail, Redmond, WA (US); John G. Bedworth, Redmond, WA (US); Mark A. Alcazar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1601 days.

(21) Appl. No.: 10/894,918

(22) Filed: Jul. 20, 2004

(65) Prior Publication Data

US 2004/0261083 A1    Dec. 23, 2004

Related U.S. Application Data

(62) Division of application No. 09/675,693, filed on Sep. 29, 2000, now Pat. No. 7,069,507.

(51) Int. Cl.
*G06F 9/318* (2006.01)
(52) U.S. Cl. ...................................... 719/318
(58) Field of Classification Search ................. None
See application file for complete search history.

(56) References Cited

U.S. PATENT DOCUMENTS

| 5,246,795 | A | | 9/1993 | Megahed et al. |
| 5,276,795 | A | | 1/1994 | Hoeber et al. |
| 5,305,454 | A | * | 4/1994 | Record et al. ............... 719/318 |
| 5,544,048 | A | | 8/1996 | Dugan et al. |
| 5,649,024 | A | | 7/1997 | Goldsmith |
| 5,682,532 | A | | 10/1997 | Remington et al. |
| 5,694,151 | A | | 12/1997 | Johnston, Jr. et al. |
| 5,771,384 | A | | 6/1998 | Remington et al. |
| 5,802,534 | A | | 9/1998 | Hatayama et al. |
| 5,835,769 | A | | 11/1998 | Jervis et al. |
| 5,867,144 | A | | 2/1999 | Wyard |
| 5,884,024 | A | | 3/1999 | Lim et al. |
| 5,890,177 | A | | 3/1999 | Moody et al. |
| 5,925,108 | A | * | 7/1999 | Johnson et al. ............. 719/318 |
| 5,930,813 | A | | 7/1999 | Padgett et al. |
| 5,956,736 | A | | 9/1999 | Hanson et al. |
| 6,035,119 | A | | 3/2000 | Massena et al. |
| 6,061,696 | A | | 5/2000 | Lee et al. |

(Continued)

OTHER PUBLICATIONS

Verisign Inc., "Licensing verisign certificates: securing multiple web server and domain configurations", www.msctrustgate.com/pdf/licensing.pdf, white paper,(2001).

(Continued)

*Primary Examiner*—Hyung S Sough
*Assistant Examiner*—Syed Roni

(57) ABSTRACT

An extensible editor allows integration of extensions that modify the editor's default behavior and provide customized feedback to users. The editor includes an event routing model that works to decrease the occurrence of conflicts between the editor and extensions and between extensions. Upon the occurrence of an event, the editor routes the event to each extension before the editor's default handling of the event occurs. When an extension responds to an event, the extension may "consume" the event by indicating to the editor not to allow further processing of the event. After an event has been pre-processed by each extension, the default editor acts on the event. The editor then routes the event to each extension again, to allow each extension to process the event after the default editor has acted.

22 Claims, 7 Drawing Sheets

U.S. PATENT DOCUMENTS

| | | | |
|---|---|---|---|
| 6,101,509 | A | 8/2000 | Hanson et al. |
| 6,173,337 | B1 | 1/2001 | Akhond et al. |
| 6,240,430 | B1 | 5/2001 | Deike et al. |
| 6,253,236 | B1 | 6/2001 | Troxel et al. |
| 6,256,739 | B1 | 7/2001 | Skopp et al. |
| 6,268,852 | B1 | 7/2001 | Lindhorst et al. |
| 6,289,450 | B1 | 9/2001 | Pensak et al. |
| 6,327,254 | B1 | 12/2001 | Chuah |
| 6,337,696 | B1 | 1/2002 | Lindhorst et al. |
| 6,356,954 | B2 * | 3/2002 | Golding ...................... 719/310 |
| 6,442,588 | B1 | 8/2002 | Clark et al. |
| 6,462,752 | B1 * | 10/2002 | Ma et al. .................... 345/684 |
| 6,480,206 | B2 | 11/2002 | Prinzing |
| 6,518,989 | B1 | 2/2003 | Ishikawa |
| 6,714,219 | B2 | 3/2004 | Lindhorst et al. |
| 6,874,084 | B1 | 3/2005 | Dobner et al. |
| 2002/0124172 | A1 | 9/2002 | Manahan |
| 2002/0184491 | A1 | 12/2002 | Morgan et al. |
| 2003/0028762 | A1 | 2/2003 | Trilli et al. |
| 2005/0268100 | A1 | 12/2005 | Gasparini et al. |
| 2006/0053293 | A1 | 3/2006 | Zager et al. |
| 2006/0218403 | A1 | 9/2006 | Sauve et al. |

OTHER PUBLICATIONS

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

Ncipher Inc., "Protecting commercial secure web servers from key-finding treats", www.ncipher.com/uploads/resources/pcws.pdf, white paper,(1999).

"flaggeditems.png", *Print screen from Internet Search*, Retrieved from <http://web.archive.org/web/20050623095655/http://ranchero.com/images/nnw2/flaggeditems.png> on Nov. 13, 2008, 1 page.

"Ranchero Software: What's New in NetNewsWire 2.0", *Web article*, retrieved from <http://web.archive.org/web/20050618014501/http://ranchero.com/netnewswire/whatsnew/netnewswire20.php> on Nov. 13, 2008,pp. 1-3.

"syncing.png", *Print Screen from article*, retrieved from <http://web.archive.org/web/20050623095327/http://ranchero.com/images/nnw2/syncing.png> on Nov. 13, 2008,1 page.

"Ranchero Software Search Engine Subscriptions", *On-line Article*, Retrieved from <http://web.archive.org/web/20050714082710/http://ranchero.com/netnewswire/features/searchEngineSubscriptions.php> on Nov. 13, 2008,pp. 1-2.

"SearchFeed.png", *Print screen in article*, Retrieved from <http://web.archive.org/web/20050623095831/http://ranchero.com/images/nnw2/searchFeed.png> on Nov. 13, 2008,1 page.

"Searching.png", *Print Screen from article*, Retrieved from <http://web.archive.org/web/20050623095422/http://ranchero.com/images/nnw2/searching.png> on Nov. 13, 2008,1 page.

"Ranchero Software_Smart Lists", *Internet Article*, Retrieved from <http://web.archive.org/web/20050602084724/http://ranchero.com/netnewswire/features/smartLists.php> on Nov. 13, 2008,pp. 1-2.

"smartList.png", *Print Screen from Internet Article*, Retrieved from <http://web.archive.org/web/20050623095628/http://ranchero.com/images/nnw2/smartList.png> on Nov. 13, 2008,1 page.

"Ranchero Software_Flagged Items", *Internet Article*, Retrieved from <http://web.archive.org/web/20050612083011/http://ranchero.com/netnewswire/features/flaggedItems.php> on Nov. 13, 2008,1 page.

"Rancho Software_Features Chart", *InternetArticle*, Retrieved from <http://web.archive.org/web/20050609010027/http://ranchero.com/netnewswire/featureschart20.php> on Nov. 13, 2008,pp. 1-3.

"Persistence.png", *Print Screen from Internet Article*, Retrieved from <http://web.archive.org/web/20050623095937/http://ranchero.com/images/nnw2/persistence.png> on Nov. 13, 2008,1 page.

"Ranchero Software_Subscription Sharing", *Internet Article*, Retrieved from <http://web.archive.org/web/20050811083741/http://ranchero.com/netnewswire/features/sharing.php> on Nov. 13, 2008,pp. 1-3.

"mainWindow2.png", *Print Screen from Internet Article*, Retrieved from <http://web.archive.org/web/20050623095300/http://ranchero.com/images/nnw2/mainWindow2.png> on Nov. 13, 2008,1 page.

"Ranchero Software_NetNewsWire", *Internet Article*, Retrieved from <http://web.archive.org/web/20051003204517/ranchero.com/netnewswire/> on Nov. 13, 2008,pp. 1-5.

"Search Engine Subscriptions", *Internet Article*, Retrieved from <http://web.archive.org/web/20051217013212/http://ranchero.com/netnewswire/helpBook/searchEngineSubs.html> on Nov. 13, 2008,1 page.

"Syncing", *Internet Article*, Retrieved from <http://web.archive.org/web/20051217023557/http://ranchero.com/netnewswire/helpBook/syncing.html> on Nov. 13, 2008,pp. 1-2.

"Subscribing and Unsubscribing", *Internet Article*, Retrieved from <http://web.archive.org/web/20060915152527/http://ranchero.com/netnewswire/helpBook/subUnsub.html> on Nov. 13, 2008,pp. 1-2.

"Ranchero Software_NetNewsWire 2.0 Change Notes", *Internet Article*, Retrieved from <http://web.archive.org/web/20051024203943/http://ranchero.com/netnewswire/changenotes/netnewswire20.php> on Nov. 13, 2008,pp. 1-3.

"Yahoo! Search Services and Tools", *Internet Search Screen*, Retrieved from <http://web.archive.org/web/20051001065344/http://search.yahoo.com/mrss/submit> on Nov. 13, 2008,1 page.

"Yahoo! Publishers Guide to RSS : Submit your RSS Feed" *Internet Article*, Retrieved from <http://web.archive.org/web/20051216153612/http://uk.promotions.yahoo.com/publisher/submit.html> on Nov. 13, 2008,pp. 1-3.

"Blogdigger—Add Feed Form", *Internet Resource*, Retrieved from <http://web.archive.org/web/20050618015745/http://www.blogdigger.com/add.jsp> on Nov. 13, 2008 1 of> on Nov. 13, 2008,1 page.

"RSS Submissions", *Internet Article*, Retrieved from <http://web.archive.org/web/20050619014308/http://www.rss-specifications.com/rss-submission.htm> on Nov. 13, 2008,pp. 1-3.

"Ranchero Software_Editing LiveJournal Logs", *Internet Article*, Retrieved from <http://web.archive.org/web/20051217022724/http://ranchero.com/netnewswire/tips/livejournalconfig.php> on Nov. 13, 2008,pp. 1-3.

"Ranchero Software_NetNewsWfaq", *Internet Search Engine FAQ sheet*, Retrieved from <http://web.archive.org/web/20030201120948/http://ranchero.com/netnewswire/faq.php> on Nov. 13, 2008,pp. 1-4.

"NetNewsWire_helpbook_faq", *Internet Search FAQ sheet*, Retrieved from <http://web.archive.org/web/20050623234918/http://ranchero.com/netnewswire/helpBook/faq.html> on Nov. 13, 2008,pp. 1-3.

"Syndic8.com—Documents1", *Internet Article*, Retrieved from <http://web.archive.org/web/20050513214756/http://www.syndic8.com/documents/howto/> on Nov. 13, 2008,pp. 1-3.

"Syndic8.com—Documents2", *Internet Article*, Retrieved from <http://web.archive.org/web/20050622035505/http://www.syndic8.com/documents/howto/> on Nov. 13, 2008,pp. 1-3.

"Syndic8.com—HowToUse", *Internet Article*, Retrieved from <http://web.archive.org/web/20050619233841/http://www.syndic8.com/howto.php > on Nov. 13, 2008,pp. 1-4.

"Kalsey—Blogfeed", *Internet Article*, Retrieved from <http://web.archive.org/web/20050515005125/http://www.kalsey.com/tools/blogfeed/> on Nov. 13, 2008,pp. 1-3.

"Feed Splicing, Part 1", Retrieved from: "http://blogs.feedburner.com/feedburner/archives/2004/07/feed_splicing_part_i.php", (Jul. 14, 2004),5 Pages.

"Introduction to RSS", Retrievedfrom: "http://www.webreference.com/authoring/languages/xml/rss/intro.", 3 Pages, Mar. 27, 2000.

"Feed Splicing, Part 2", Retrieved from: "http://blogs.feedburner.com/feedburner/archives/2004/08feed_splicing_part_ii.php", The Feed Thickens. http://blog.flicker.net/en/2007/14/the-feed-thickens.,5 Pages.

"FeedBurner", Retrieved from <http://www.feedburner.com> on Dec. 8, 2008, (Feb. 25, 2004),1 Page.

Neibauer; "The ABC's of WordPerfect 8 1997" Sybex Second Edition pp. 29-30 and 89-90, Published 1997.

Appenzeller, et al.; "User-friendly access control for public network ports", INFOCOM '99.18th Annual Joint Conference of the IEEE Computer and Communications Societies. Proceedings IEEE, Mar. 21-25, 1999, NYC, pp. 699-707.

Walkowski, "10 Minute Guide to WordPerfect 5.1 for Windows", Copyright 1992.

Simpson, "Mastering WordPerfect for Windows", Sybex, 1993, pp. 25.

* cited by examiner

EVENT ROUTING MODEL FOR AN EXTENSIBLE EDITOR

RELATED APPLICATION

This application is a divisional application of and claims priority to U.S. patent application Ser. No. 09/675,693, filed Sep. 29, 2000, the disclosure of which is incorporated by reference.

TECHNICAL FIELD

The systems and methods described herein relate to extensible editors and, more particularly, the described implementations relate to event routing in extensible editors.

BACKGROUND

The process of editing electronic documents generally consists of processing events and key combinations received by an editor. From events and key combinations, an editing space is created. The editing space consists of a document state plus a view state (visual feedback). The view state includes a selection state (what is selected, what is shown as feedback), scroll position, etc. The event interacts with the current state, and an editing model is applied to manipulate feedback or to manipulate the document based on the feedback.

Extensible editors typically provide a set of document manipulation services that can enable macros to perform advanced tasks on the content of a document. With an extensible editor, developers can integrate extensions that define or re-define a manner in which the editor responds to events or key combinations and provides visual feedback to a user. For example, if a developer wishes to create a new look to a selection process or a highlighting process in an extensible editor, the developer can create an extension that receives input regarding cursor position, cursor movement, mouse actions, etc. The developer can design the extension to use this input to create visual feedback that differs from default selection services or highlight services of the editor. However, familiar behavior of the editor (such as clicking a "bold" button) is still retained by the editor. In addition, an extension can also expose virtually any kind of functionality through its own interfaces.

Extensible editors are designed so that one or more extensions can be coupled with the editor. This is accomplished by implementing a set of interfaces to which the extensions must conform. The interfaces are utilized by the extensions to access a host of basic functions so that the extensions themselves are not required to implement such basic functions. The extensions instead utilize the basic functions to perform tasks that supplement or override functions performed by the editor.

When utilizing extensions in an extensible editor, however, a conflict problem can arise if multiple extensions are used simultaneously that act upon the occurrence of the same event or key combination. If a first extension reacts to an event in one way, but a second extension receives the event after the first extension has acted on it, the second extension may also act on the event and, as a result, override the action of the first extension. This problem can occur even when using only one extension, if the extension acts on an event or key combination but does not prevent the (default) editor from subsequently acting on the same event.

SUMMARY

An extensible editor for editing electronic documents and/or content is described herein. The extensible editor provides an event routing model that improves avoidance of extension-extension and editor-extension event handling conflicts. The extensible editor ("editor") includes three sets of interfaces for extension integration.

The first set of interfaces is part of a designer extensibility mechanism. The designer extensibility mechanism is used to couple an extension (also called a "designer") to the editor so the extension can utilize the event routing model of the editor. The designer extensibility mechanism provides the ability to connect an editor extension that can modify editing behavior. An attached designer receives events and key combinations in a predefined order and uses the set of interfaces to create custom editing extensions.

The designer extensibility mechanism includes an edit designer interface that has four methods: translate accelerator, pre-handle event, post-handle event and post-event notify. The methods act as callback routines whenever an event occurs in the editing environment of the editor. When an event comes into the editor, the four methods intercept the event at different points of the editor's event handling process. The editor invokes the methods sequentially. If multiple designers are utilized, the editor invokes the current method on each designer sequentially, in the order in which the designers were registered with the editor.

If a designer acts on an event and wants to prevent any subsequent designer (or the editor) from acting on the event, the designer "consumes" the event by returning an appropriate signal to the editor. The designer returns a different signal when subsequent processing is to continue on an event.

Key combinations entered through a keyboard (e.g., Ctrl-A, Alt-P, etc.) first pass through the "translate accelerator" method. This is done in the order that the designers were added to the editor. If an event is generated by keyboard input (i.e., a key combination was entered), then the designer acts upon the event and "consumes" the event so that subsequent designers or the default editor cannot subsequently act upon the event.

The post-editor event notify method is an exception to the rule that consumed events are not passed on to subsequent designers or the editor for further processing. This method is always called on all designers, regardless of whether, or when, an event is consumed. This allows each designer to clean up any internal states that may be anticipating an event that is consumed before reaching the designer.

The second set of interfaces is included in a selection services component of the editor. The selection services component provides designers (i.e., editing extensions) with the ability to manage logical selections that are used by commands and other extensions, i.e., the ability to modify the logical selection state of the editor. As a result, all editing commands and services will be able to interact with a custom selection model without having detailed knowledge of the designer that is implementing the selection.

The third set of interfaces is included in a highlight rendering services component. The highlight rendering component allows a user to modify the rendered character attributes of text without modifying the document content. This facility is critical for providing a mechanism for providing user feedback without affecting persistence, undo, etc.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
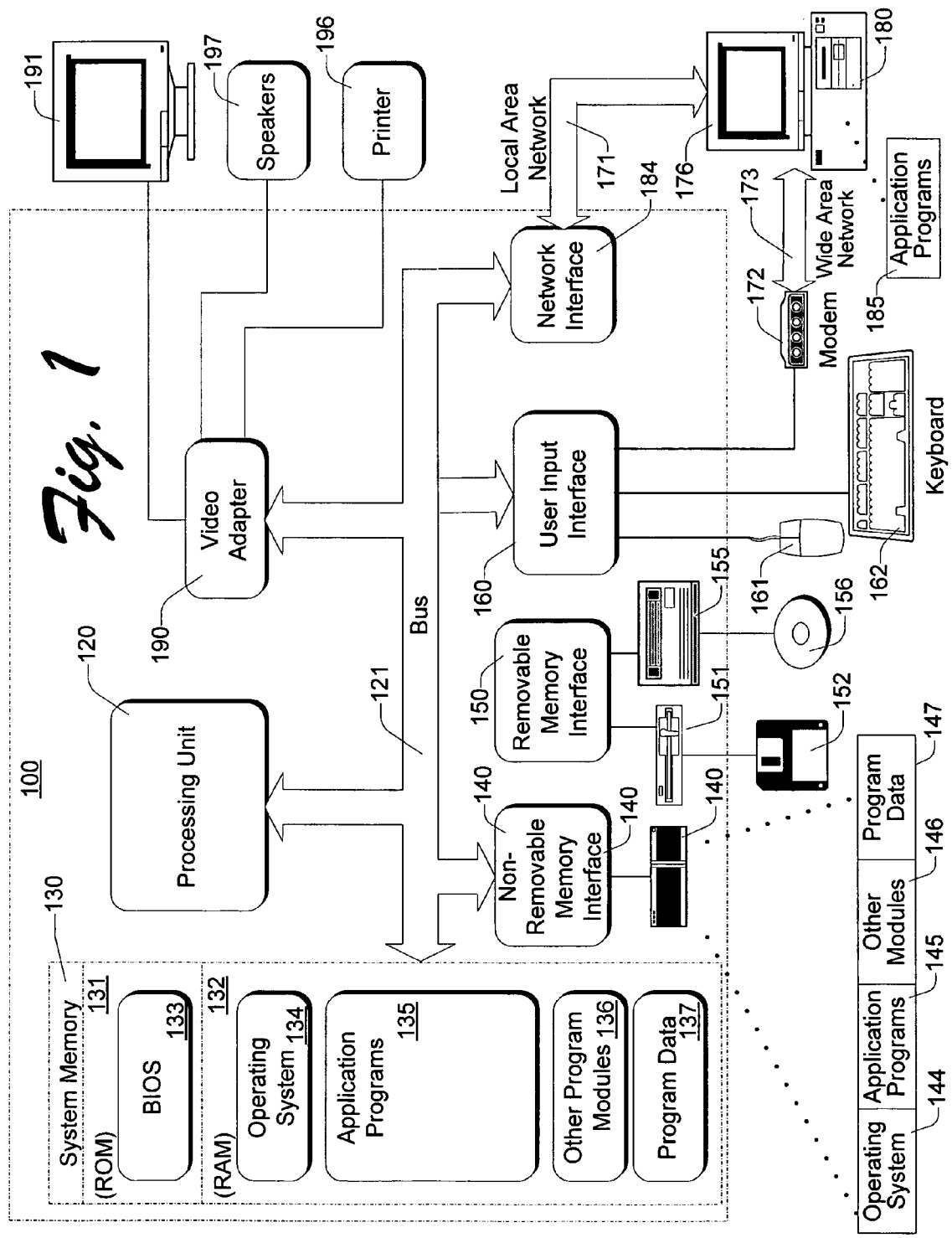
FIG. 1 is an exemplary computer system on which the present invention may be implemented.

The invention is illustrated in the drawings as being implemented in a suitable computing environment. Although not required, the invention will be described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary Computer Environment

The various components and functionality described herein are implemented with a number of individual computers. FIG. 1 shows components of typical example of such a computer, referred by to reference numeral 100. The components shown in FIG. 1 are only examples, and are not intended to suggest any limitation as to the scope of the functionality of the invention; the invention is not necessarily dependent on the features shown in FIG. 1.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
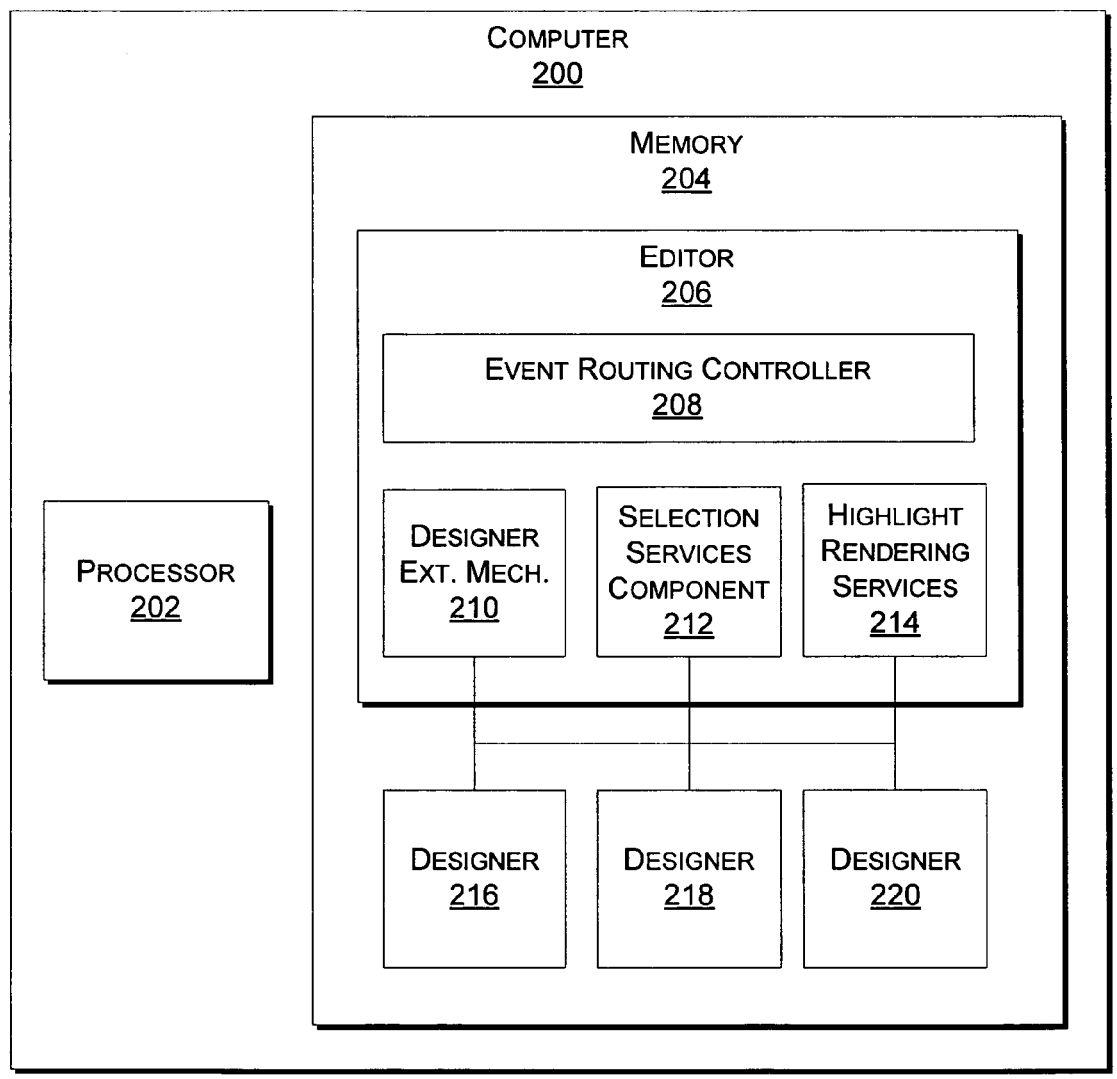
FIG. 2 is a block diagram of a computer having an extensible editor and several extensions coupled with the editor stored in memory.

FIG. 2 is a block diagram of a computer 200 having a processor 202 and 11 memory 204. An extensible editor 206 stored in the memory 204 includes an event routing controller 208, a designer extensibility mechanism 210, a selection services component 212, and a highlight rendering services component 214. Three designers 216, 218, 220 are also stored in the memory 204. Each of the designers 216-220 communicates with the editor 206 via the designer extensibility mechanism 210. Each designer 216-220, as shown, also communicates with the selection services component 212 and the highlight rendering component 214. It is noted, however, that a designer 216-220 may communicate with only the selection services component 212 or the highlight rendering component 214 or with neither. However, as will become clear in the following discussion, each designer 216-220 must attach to the editor 206 through the designer extensibility mechanism 210.

A designer is an editor extension that is used to extend the functionality of the editor 206 and to customize the behavior of the editor 206. While the term "extension" is a generic term for a designer, the term "designer" is utilized in several products of the MICROSOFT CORP., such as INTERNET EXPLORER 5.5, MSHTML (the HTML parsing and rendering engine of INTERNET EXPLORER that displays a document with editable content), the WebBrowser (ActiveX) control, etc. For purposes of the present discussion, terms specific to one or more of such products will be used. For example, in the present discussion, editor extensions will be referred to as designers. A reference to such a specific term (e.g., designer) is intended to include reference to the more generic term (e.g., extension).

The designers 216-220 work by intercepting events and commands occurring in, or received by, the editor 206. When one or more of the designers 216-220 intercepts an event, the designer can change how the editor 206 handles the event. Generally, a designer is written to either supplement or override the editor's behavior. Several designers may be attached to the editor 206 at once, thereby dynamically enabling multiple levels of custom functionality.

Designers offer a very powerful tool for customizing the editor 206. Virtually any part of the editor's behavior can be changed. For example, designers may be used to add spell checking capability to the editor 206, to add table editing functionality, to add annotation or revision-tracking capability, and so on. It is noted that, although only three designers 216-220 are shown in conjunction with the editor 206, any number of designers may be connected to the editor 206.

The designer extensibility mechanism 210, the selection services component 212, and the highlight rendering services 214 of the editor 206 shown in FIG. 2 provide specific functionality to the editor 206. Each of the modules and the functionality it provides will be discussed separately, in detail, below.

Designer Extensibility Mechanism

Figure 3:
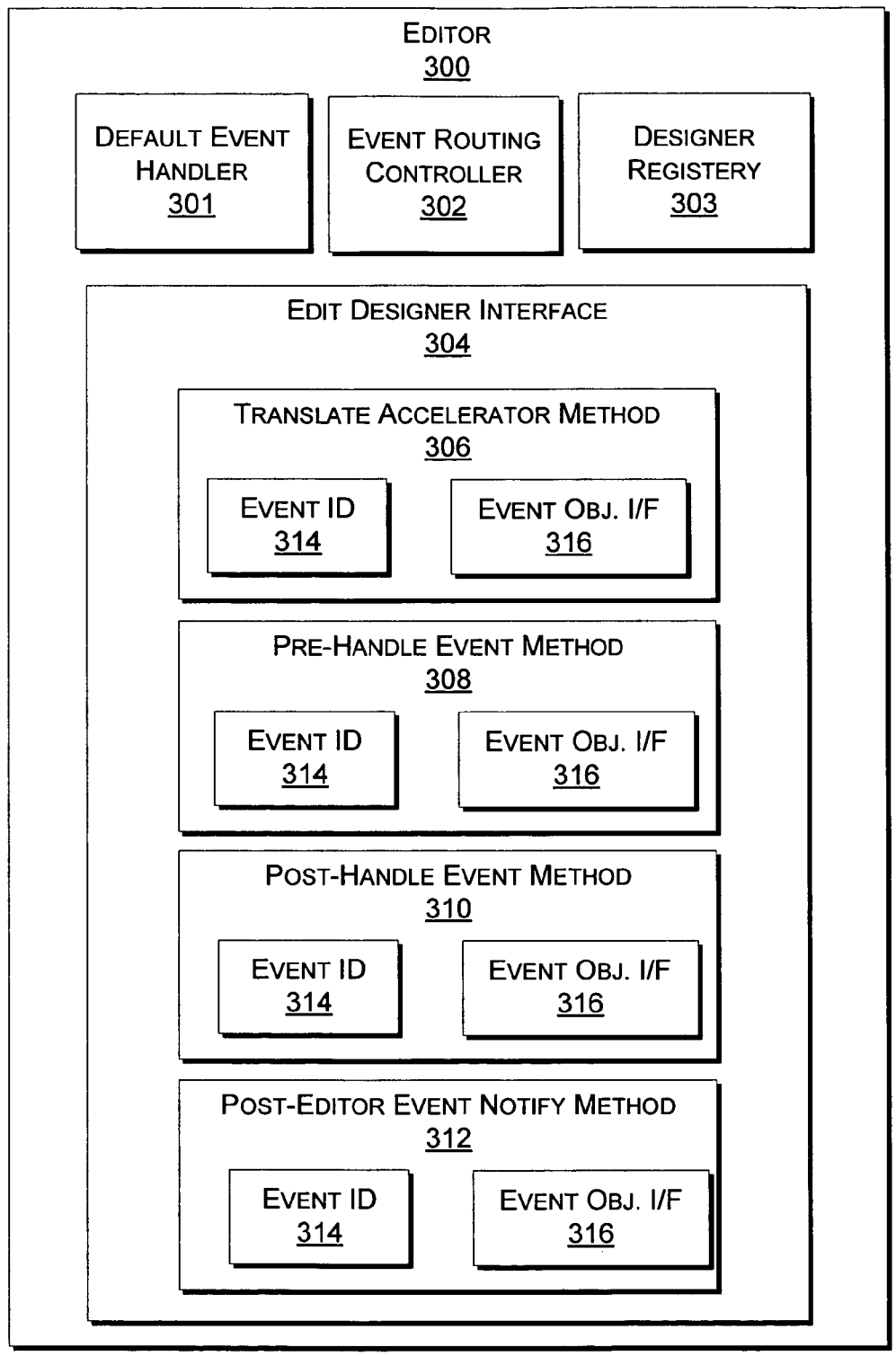
FIG. 3 is a block diagram of an editor including a designer interface.

FIG. 3 is a block diagram of an editor 300 similar to the editor 206 shown in FIG. 2. The editor 300 includes a default event handler 301, an event routing controller 302 and a designer registry 303. The editor also includes an edit designer interface 304 that has several methods through which one or more designers (not shown) communicate with the editor 300. Each designer that is coupled with the editor 300 communicates with the editor 300 through the edit designer interface 304. Any coupled designer may then communicate with any other interfaces that are a part of the editor 300.

When a designer is added to the editor 300, the designer is registered in the designer registry 303. The event routing controller 302 accesses the designer registry 303 to determine the designers that are coupled with the editor 300. As will be discussed in greater detail below, the event routing controller 302 utilizes the designer registry 303 when routing events to attached designers.

The methods of the edit designer interface 304 are a translate accelerator method 306 (TranslateAccelerator), a pre-handle event method 308 (PreHandleEvent), a post-handle event method 310 (PostHandleEvent), and a post-editor event notify method 312 (PostEditorEventNotify). Each method 306-312 has two parameters, an event identifier 314 and an event object interface 316. In one implementation, the event identifier 314 is a value included in HTMLELEMENTEVENTS2 in mshtmdid.h, and the event object interface 316 is an IHTMLEventObj, which enables a designer to obtain more extended information about the event.

The methods 306-312 act as callback routines whenever an event occurs in the editing environment. In other words, whenever an event occurs that is detected by the editor 300, each of the methods 306-312 is called, in a particular sequence, by the editor 300 to process the event. Processing the event may entail providing an external response to the event, responding internally to the event, not responding to the event, consuming the event and/or passing the event for further processing (i.e., not consuming the event).

The event routing controller 302 determines when a particular method will be called. If multiple designers are registered with the editor 300 in the designer registry 303, the event routing controller 302 invokes the current method on each designer sequentially, in the order in which the designers were registered with the editor 300. Further explanation of the event routing technique will be explained below with continuing reference to the elements and reference numerals of FIG. 3.

Figure 4:
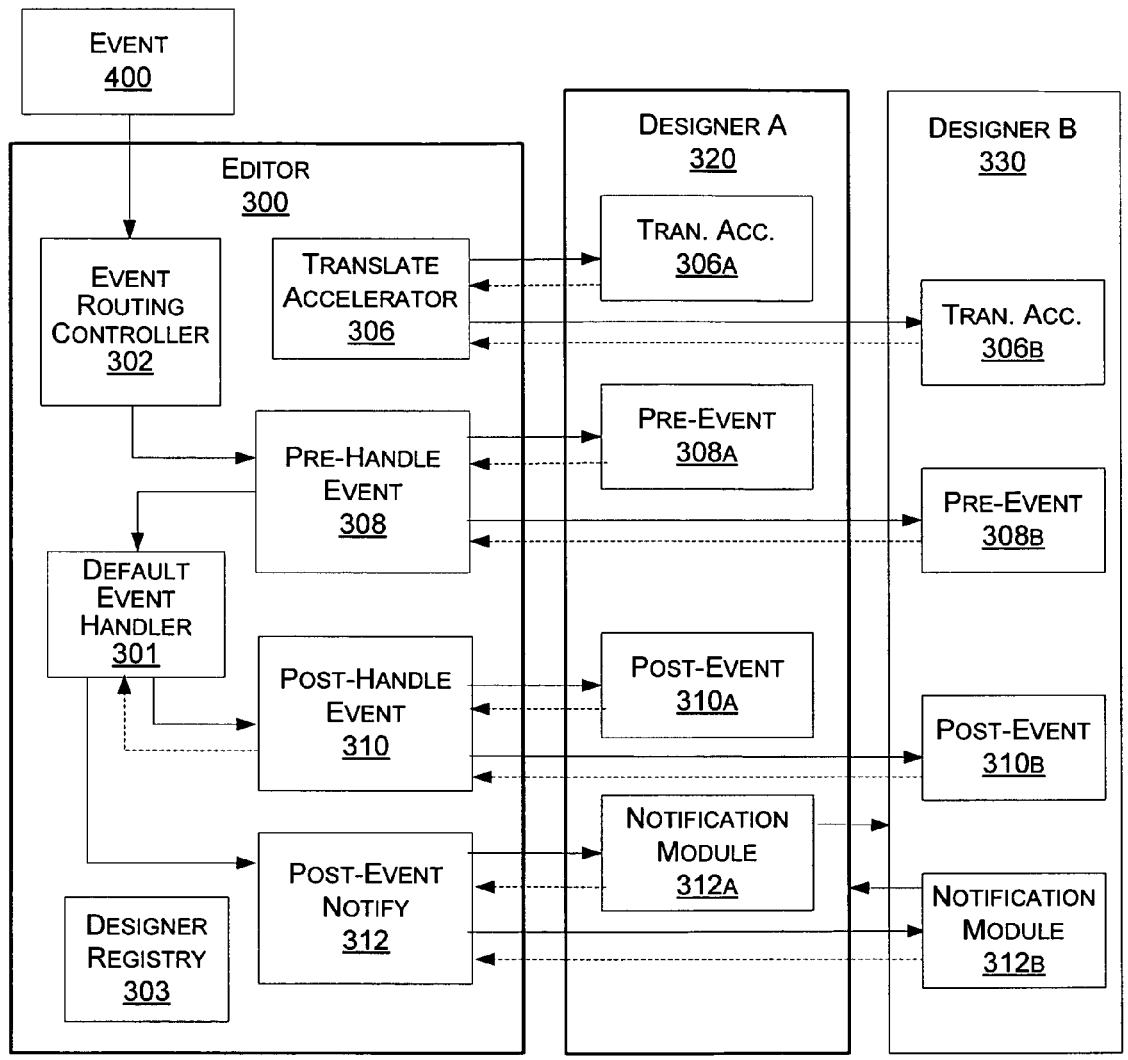
FIG. 4 is a block diagram of an event routing model utilized in an extensible editor.

FIG. 4 is a block diagram of an event routing model utilized in an extensible editor. In addition to the editor 300 shown in FIG. 3, FIG. 4 includes a first extension, Designer A 320, and a second extension, Designer B 330. Although only two designers 320, 330 are shown, it should be understood that virtually any number of designers may be added to the editor 300. The functionality of the routing mechanism when using more than two designers is similar to the description of the routing mechanism using the two designers 320, 330.

The editor 300 is designed to receive notification of an event 400. If the event 400 is a key combination input by a user, then the event routing controller 302 routes the event to the translate accelerator method 306. The event 400 is made available to a translation accelerator 306a in Designer A 320. The translation accelerator 306a of Designer A 320 may or may not provide a response to the event 400. If a response is provided to the event 400 by Designer A 320, then Designer A 320 may consume the event 400 to prevent Designer B 330 from overriding the response to the event 400 by Designer A 320. To "consume" an event, a designer returns a value (S_OK) to the editor indicating that no further processing should be done on the event. If Designer A 320 does not respond to the event 400, then the event 400 will be made available to a translation accelerator 306b of Designer B 330. To indicate that an event should continue to be processed, a designer returns a different value to the editor (S_FALSE). Designer B 330 may then respond or not respond to the event 400 in the same way as described for Designer A 320. This process continues with any other designers that may be attached to the editor 300.

After each designer 320, 330 has had the opportunity to react to the event 400 (unless one of the designers 320, 330 has already consumed the event), control of the event 400 is returned to the event routing controller 302 of the editor 300. It is noted that the editor 300 may include its own translate accelerator that is designed to translate the key combination. This translate accelerator could be a part of the default event handler 301. In the preferred implementation, the default event handler 301 will receive the key combination (event 400) if not already consumed by one of the designers 320, 330. The default event handler 301 may or may not be configured to provide a response to the particular key combination. If it is configured to respond to a particular key combination, then an appropriate response is made; if not, then no response will be made to the key combination.

It is significant that if Designer B 330 is configured to act on a particular key combination, Designer B 330 may never receive that key combination if Designer A 320 consumes the combination. Therefore, it is noted that while the implementations described herein significantly improve conflict avoidance in extensible editors, when developing a new designer, careful consideration must be given to the key combinations and events that will trigger actions by a designer. Also, multiple designers can be strategically registered with the editor 300 to avoid this situation.

If the event 400 is not a key combination, then the event routing controller makes the event 400 available to the designers 320, 330 via the pre-handle event method 308. Designer A 320 first has the opportunity to respond to the event 400. If Designer A 320 is configured to respond to the event 400, then it provides an appropriate response. After providing a response, Designer A 320 may either consume the event 400 or pass it along.

If, for example, Designer A 320 is an "auto correct" designer and Designer B 330 is a grammar checking designer, an event (entry of a word into the document) would be routed first through the auto correct designer to determine if the word should be corrected. After the word is checked (whether or not it is corrected), the grammar checking designer still requires notice of the event to perform its function. Therefore, Designer A 320 would act on the event but still make it available to Designer B 330

If the event 400 is not consumed by Designer A 320, then the event 400 is made available to Designer B 330. Designer B 330 has the same options of reacting to the event 400 as described above for Designer A 320. This is true for each subsequent designer attached to the editor 300.

After each designer has the opportunity to respond to the event 400 a first time, the event is passed to the default event handler 301 (assuming that the event 400 has not been previously consumed by a designer). The default event handler 301 then provides the default behavior of the editor 300 in response to the event 400. It is noted that if no designers are attached to the editor 300, then the editor 300 will simply provide the default editing behavior via the default event handler 301.

After the default event handler 301 has acted on the event 400, the designers 320, 330 are provided another opportunity to respond to the event 400. The event 400 is made available to the designers 320, 330 through the post-handle event method 310. The post-handle event processing is similar to the pre-handle event processing, occurring in the sequence in which the designers 320, 330 were registered with the editor 300.

By way of example, suppose that a developer wants to implement an "auto correct" designer that listens to key strokes. The designer, in this case, should receive an event after a typed character is inserted into the document (i.e., PostHandleEvent) rather than before the character is inserted. Receiving the event after the default editor has inserted the character allows the designer to inspect the document with the correct content, allow undo of auto-correct behavior, etc.

After the post-handle event processing is concluded, the event 400 is processed by the default handler 301.

The post-editor event notify method 312 is called after the editor 300 has finished it post-handling of the event 400 or when a designer 320, 330 has consumed the event. In the case where the event 400 is consumed by a designer 320, 330 before a default action takes place and no post-handle event methods are called, a post-editor event notification module 312a, 312b is invoked to give the designers 320, 330 an opportunity to make a final response. For example, suppose a mouse down event starts a selection in a designer that implements basic text selection. If there is a mouse down event, the designer starts the selection. Now, if some other designer consumes the corresponding mouse up event, the designer still needs to know about the mouse up event so it can terminate the selection and stop responding to mouse move events.

Figure 5:
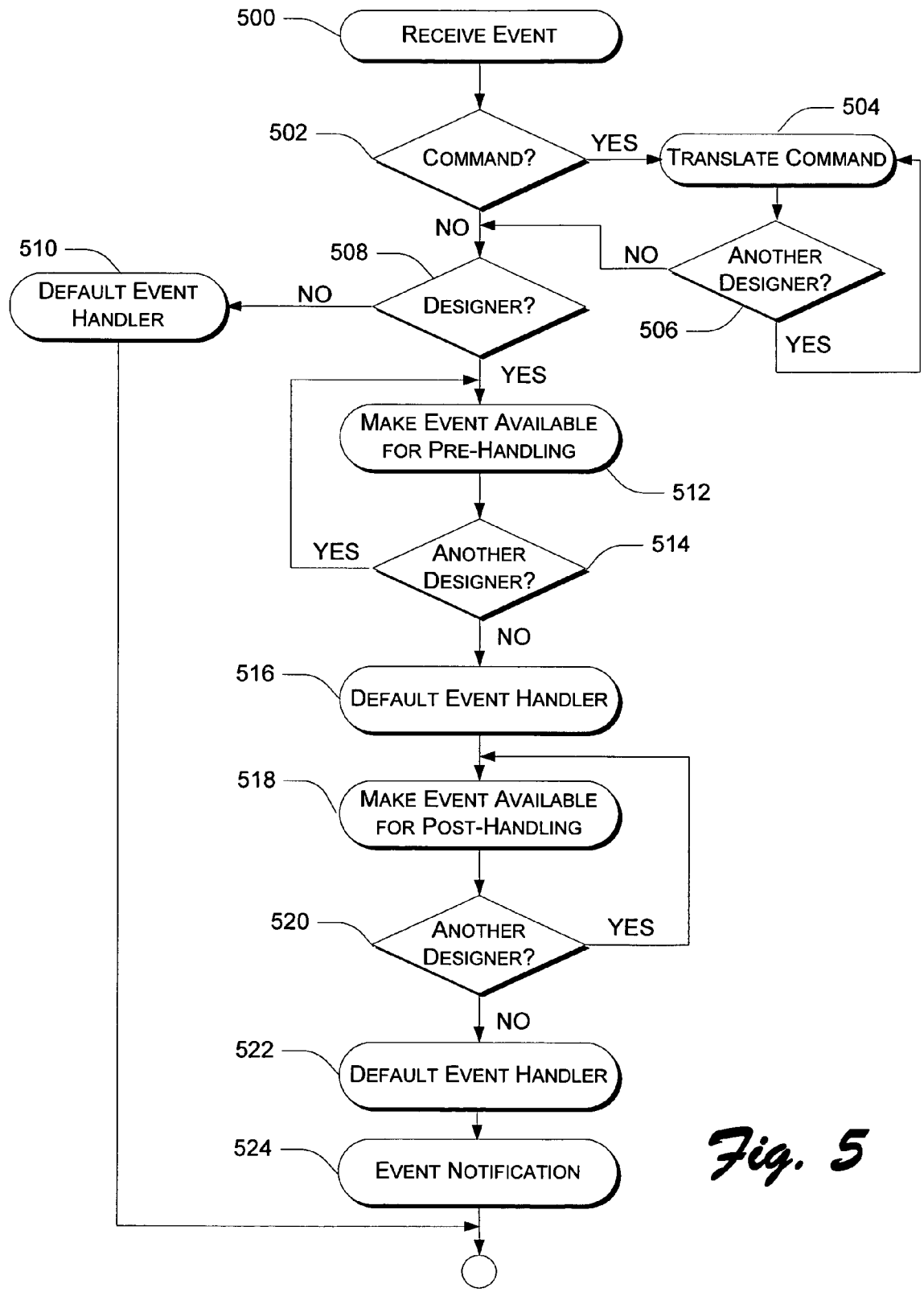
FIG. 5 is a flow diagram of an event routing model for use in an extensible editor.

FIG. 5 is a flow diagram of the preferred implementation of the event routing model described above for use in an extensible editor 300. Continuing reference will be made to the elements and reference numerals of FIG. 2-FIG. 4 in the description of the flow diagram.

At step 500, an event 400 is received by the editor 300. The event routing controller 302 determines if the event 400 is a key combination at step 502. If the event is a key combination ("Yes" branch, step 502), then the key combination is translated at step 504 by the designers (if they are configured to translate the particular command) or by the default event handler 301 if no designer translates the key combination and the editor 300 is configured to do so.

If the event is not a key combination ("No" branch, step 502) the editor 300 determines if a designer 320, 330 is attached to the editor 300 at step 508. If there is not an attached designer ("No" branch, step 508), the event is processed by the default event handler 301 at step 510. If, however, a designer 320, 330 is attached to the editor 300 ("Yes" branch, step 508), then the event 400 is made available to Designer A 320 for pre-handling at step 512. After Designer A 320 has had the opportunity to act on the event 400, Designer B 330 ("Yes" branch, step 514) has the event 400 made available for processing at step 512. There is no other designer attached ("No" branch, step 514), so the event (if not previously consumed), is passed to the default event handler 301 and processed at step 516.

After the event 400 is processed by the default event handler 301 of the editor 300, the event is made available to Designer A 320 for processing at step 518. Since there is another designer (Designer B 330) ("Yes" branch, step 520), the event 400 is made available to Designer B 330 for processing at step 518. When there are no more designers to process the event 400 ("No" branch, step 520), the event is processed by the default event handler 301 at step 522.

It is noted that the above discussion assumes that the event 400 is not consumed by the default event handler 301 or the designers 320, 330 and is processed by each method of the editor 300 and the designers 320, 330. Once an event is consumed, further processing of the event terminates.

After the event has been through the pre-handle event method 308 and the post-handle event method 310, the post-editor event notification method 312 is called (step 524). Unless consumed by the default event handler 310 or one of the designers 320, 330, each designer 320, 330 is notified of any response to the event 400 from any other module as previously described.

Designer Extensibility Mechanism Interfaces

In addition to the edit designer interface 304 described above, the designer extensibility mechanism 210 includes an edit services interface. In MSHTML, the edit services interface—designated as IHTMLEditServices—is used to add or remove edit designers and control the current selection. Although the general descriptions of the designer extensibility mechanism can be applied and implemented in any extensible editor and extensions therefor, for discussion purposes, the described implementation will refer to MICROSOFT MSHTML terminology to describe interfaces exposed by a designer extensibility mechanism to allow extensions to be properly coupled to communicate with an extensible editor. Those skilled in the art will appreciate the functions enabled by the described interfaces to implement custom extensions for the extensible editor.

The following are detailed descriptions of the edit designer interface and the edit services interface.

Edit Designer Interface (IHTMLEditDesigner)

The edit designer interface includes the following methods:

TranslateAccelerator

Description: Called by MSHTML to translate a key combination entered by a user into an appropriate command.

Syntax:
    HRESULT TranslateAccelerator (
        DISPID inEvtDispId,
        IHTMLEventObj *pIEventObj
Parameters:
    inEvtDispId
        [in] DISPID that specifies the event.
    pIEventObj
        [in] Pointer to an IHTMLEventObj interface that specifies the event.

Return Values:

Returns S_OK to indicate that the event has been completely handled and that no further processing should take place, either by other edit designers or the MSHTML Editor. Returns S_FALSE to indicate that other edit designers and the MSHTML Editor should perform their processing the this event.

PreHandleEvent

Description: Called by MSHTML before the MSHTML Editor processes an event, so that the designer can provide its own event handling behavior.

```
Syntax:
    HRESULT PreHandleEvent (
        DISPID inEvtDispId,
        IHTMLEventObj *pIEventObj
    Parameters:
        inEvtDispId
            [in] DISPID that specifies the event.
        pIEventObj
            [in] Pointer to an IHTMLEventObj interface that
            specifies the event.
```

Return Values:

Returns S_OK to indicate that the event has been completely handled and that no further processing should take place, either by other edit designers or the MSHTML Editor. Returns S_FALSE to indicate that other edit designers and the MSHTML Editor should perform their pre-event processing.

PostHandleEvent

Description: Called by MSHTML after the MSHTML Editor processes an event, so that the designer can provide its own event handling behavior.

```
Syntax:
    HRESULT PostHandleEvent (
        DISPID inEvtDispId,
        IHTMLEventObj *pIEventObj
Parameters:
    inEvtDispId
        [in] DISPID that specifies the event.
    pIEventObj
        [in] Pointer to an IHTMLEventObj interface that specifies the
        event.
```

Return Values:

Returns S_OK to indicate that the event has been completely handled and that no further processing should take place, either by other edit designers or the MSHTML Editor. Returns S_FALSE to indicate that other edit designers and the MSHTML Editor should perform their post-event processing.

PostEditorEventNotify

Description: Called by MSHTML after an event has been handled by the MSHTML Editor and any registered edit designers.

```
Syntax:
    HRESULT PostHandleEvent (
        DISPID inEvtDispId,
        IHTMLEventObj *pIEventObj
Parameters:
    inEvtDispId
        [in] DISPID that specifies the event.
```

```
        pIEventObj
            [in] Pointer to an IHTMLEventObj interface that specifies the
            event.
```

Return Values:

Returns S_OK if successful, or an error value otherwise.

Edit Services Interface (IHTMLEditServices)

The edit designer interface includes the following methods:

AddDesigner

Description: Registers an IHTMLEditDesigner interface to receive event notification from the editor.

```
Syntax:
    HRESULT AddDesigner (
        IHTMLEditDesigner *pIDesigner
    );
    Parameters:
        *pIDesigner
            [in] Pointer to an IHTMLEditDesigner interface to register
for event notification.
```

Return Values:

Returns S_OK if successful, or an error value otherwise.

GetSelectionServices

Description: Registers an IHTMLEditDesigner interface to receive event notification from the editor.

```
Syntax:
    HRESULT GetSelectionServices (
        IMarkupContainer *pIContainer
        ISelectionServices **ppSelSvc
    );
Parameters:
    *pIContainer
        [in] Pointer to an IMarkupContainer interface for which an
        ISelectionServices interface is desired.
    **ppSelSvc
        [out] Address of a pointer to a variable that receives an
        ISelectionServices interface pointer for the ISelectionServices
        interface on the editor's selection object.
```

Return Values:

Returns S_OK if successful, or an error value otherwise.

MoveToSelectionAnchor

Description: Moves a markup pointer to the location of an anchor for the current selection.

```
Syntax:
    HRESULT MoveSelectionToAnchor (
        IMarkupPointer *pIStartAnchorr
    );
    Parameters:
        *pIStartAnchor
            [in] Pointer to an IMarkupPointer interface to
            move the location of an anchor for the selection
```

Return Values:

Returns S_OK if successful, or an error value otherwise.

MoveToSelectionEnd

Description: Moves markup pointer to the end of the current selection.

```
Syntax:
    HRESULT MoveToSelectionEnd (
        IMarkupPointer *pIEndAnchor
    );
Parameters:
    *pIEndAnchor
        [in] Pointer to an IMarkupPointer interface to move to the end
        of the current session.
```

Return Values:

Returns S_OK if successful, or an error value otherwise.

RemoveDesigner

Description: Unregisters a designer from the editor.

```
Syntax:
    HRESULT RemoveDesigner (
        IHTMLEditDesigner *pIDesigner
    );
Parameters:
    pIDesigner
        [in] Pointer to the IHTMLEditDesigner interface to remove
        from the event notification queue.
```

Return Values:

Returns S_OK if successful, or an error value otherwise.

Selection Services

Selection services provides extensions a way to modify a selection process of an extensible editor to which the designers are coupled. Although the general descriptions of the selection services can be applied and implemented in any extensible editor and extensions therefor, for discussion purposes, the described implementation will refer to MICROSOFT MSHTML terminology to describe interfaces exposed by a selection services component to allow extensions to properly communicate with an extensible editor to utilize the selection services component. Those skilled in the art will appreciate the functions enabled by the described interfaces to implement custom extensions for the extensible editor.

Figure 6:
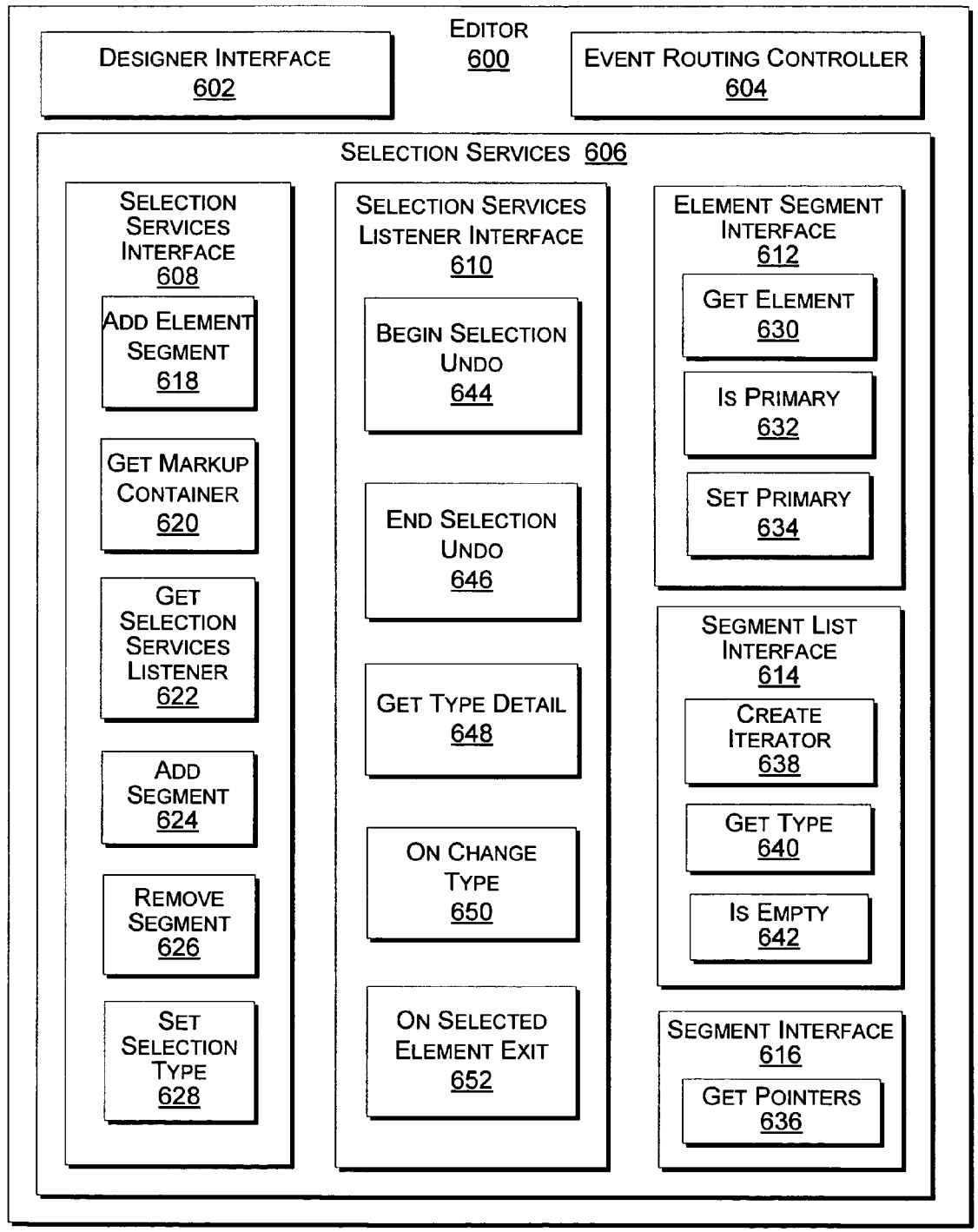
FIG. 6 is a block diagram of an editor including a selection services interface.

FIG. 6 is a block diagram of an extensible editor 600 that includes a designer interface 602, an event routing mechanism 604, and a selection services component 606. The selection services component 606 includes several interfaces: a selection services interface 608 (ISelectionServices), a selection services listener interface 610 (ISelectionServiceListener), an element segment interface 612 (IElementSegment), a segment list interface 614 (ISegmentList), and a segment interface 616 (ISegment). These interfaces 608-616 will be discussed in greater detail, below.

The role of the selection services interfaces 608-616 is to provide designers or other editing extensions with the ability to modify the logical selection state. Consequently, all editing commands and services can interact with a custom selection model without having detailed knowledge of the designer that is implementing the selection.

For example, the "bold" command is able to implement the operation of making something bold without having any knowledge of the specifics of a given designer. The command is only aware of what part of the document is selected, and it is configured to make the selected region of the document bold. A user still only has to know the click on a "bold" icon to invoke the "bold" command.

Selection Service Interface (ISelectionServices)

The selection services interface 608 provides methods to programmatically clear, add and remove segments from a selection object. The methods include an add element segment method 618 (AddElementSegment), a get markup container method 620 (GetMarkupContainer), a get selection services listener method 622 (GetSelectionServicesListener), an add segment method 624 (AddSegment), a remove segment method 626 (RemoveSegment), and a set selection type method 628 (SetSelectionType). The following are detailed description of the available selection services interface 608 methods.

AddElementSegment

Description: The add element segment method 618 creates an IElementSegment interface for an element in a markup container and adds the segment to the editable selection.

```
Syntax:
    HRESULT AddElementSegment (
        IHTMLElement *pIElement,
        IElementSegment **ppISegmentAdded
    );
Parameters:
    *pIElement
        [in] Pointer to an IHTMLElement interface that specifies the
        element to add to the selection.
    **ppISegmentAdded
        [out] Address of a pointer to a variable that receives an
        IElementSegment interface pointer for the element segment
        added to the selection environment.
```

Return Values:

Returns S_OK if successful, or an error value otherwise.

GetMarkupContainer

Description: The get markup container method 620 retrieves the markup container for the current editable selection.

```
Syntax:
    HRESULT GetMarkupContainer (
        IMarkupContainer **ppIContainer
    );
Parameters:
    **ppIContainer
        [out] Address of a pointer to a variable that receives an
        IMarkupContainer interface pointer to the interface for the
        markup container that contains the current editable selection.
```

Return Values:

Returns S_OK if successful, or an error value otherwise.

GetSelectionServicesListener

Description: The get selection services listener 622 method retrieves an ISelectionServicesListener interface for the current editable selection so that the editor can process certain selection events.

```
Syntax:
    HRESULT GetSelectionServicesListener (
        ISelectionServicesListener **ppISelectionServicesListener
    );
Parameters:
    **ppISelectionServicesListener
        [out] Address of a pointer to a variable that receives an
        ISelectionServicesListener interface pointer to the interface
        that the editor will use with the current editable selection.
```

Return Values:

Returns S_OK if successful, or an error value otherwise.

AddSegment

Description: The add segment method 624 creates an ISegment interface for the content between two markup pointers in a markup container, and adds the segment to the editable selection.

```
Syntax:
    HRETURN AddSegment (
        IMarkupPointer *pIStart,
        IMarkupPointer *pIEnd,
        ISegment **ppISegmentAdded
    );
Parameters:
    *pIStart
        [in] Pointer to an IMarkupPointer interface that specifies
        the start point for adding the segment.
    *pIEnd
        [in] Pointer to an IMarkupPointer interface that specifies
        the end point for adding the segment.
    **ppISegmentAdded
        [out] Address of a pointer to a variable that receives an
        ISegment interface pointer to the interface for the added
        segment in the selection environment.
```

Return Values:

Returns S_OK if successful, or an error value otherwise.

RemoveSegment

Description: The remove segment method 626 (RemoveSegment) removes a segment from the editable selection.

```
Syntax:
    HRESULT RemoveSegment (
        ISegment *pISegment
    );
Parameters:
    *pISegment
        [in] Pointer to an ISegment interface that specifies the
        segment to remove.
```

Return Values:

Returns S_OK if successful, or an error value otherwise.

SetSelectionType

Description: The set selection type method 628 (SetSelectionType) sets the selection type and clears any existing selection.

```
Syntax:
    HRESULT SetSelectionType;
        SELECTION_TYPE eType
        ISelectionServicesListener *pIListener
    );
Parameters:
    eType
        [in] SELECTION_TYPE enumeration that specifies the
        type of selection to set.
    *pIListener
        [in] Optional. Pointer to an ISelectionServiceListerner
        interface specifying the interface to associate with this
        selection. Set to NULL if unused. NOTE: Although this
        parameter is optional, without this parameter, the editor
        will not be able to restore the selection.
```

Return Values:

Returns S_OK if successful, or an error value otherwise.

Element Segment Interface (IElementSegment)

The element segment interface 610 provides methods that control a fragment of HTML markup in the current editable selections that consists of a single element. The element segment interface 612 includes a get element method 630 (GetElement), an 'is primary' method 632 (IsPrimary), and a set primary method 634 (SetPrimary). To obtain an IElementSegment interface for a fragment of HTML markup representing an element, the ISelectionServices::AddElementSegment method is used.

The selection object uses element segments to mark fragments of HTML markup that are whole elements, in particular control elements.

GetElement

Description: The get element method 612 (GetElement) retrieves the element to which this segment refers.

```
Syntax:
    HRESULT GetElement (
        IHTMLElement **ppIElement
    );
Parameters:
    **ppIElement
        [out] Address of a pointer to a variable that
        receives an IHTMLElement interface pointer for
        the
        interface representing the element to which the
        segment refers.
```

Return Values:

Returns S_OK if successful, or an error value otherwise.

Is Primary

Description: The is primary method 632 (IsPrimary) determines whether the control element represented by this segment is the primary element of a multi-element selection. The primary element of a multiple selection is typically the first one chosen by a user when a selection was made. The primary element typically has distinctive handles that indicate it is the primary element. For example, the primary element might have white handles while the other elements have black ones).

```
Syntax:
    HRESULT IsPrimary (
        BOOL *pfPrimary
    );
Parameters:
    *pfPrimary
        [out] Pointer to a BOOL that receives TRUE if the element
        is the primary element, or FALSE otherwise.
```

Return Values:

Returns S_OK if successful, or an error value otherwise.

Set Primary

Description: The set primary method (SetPrimary) sets or unsets a control element as a primary element in a control selection. The primary element of a multiple selection is typically the first one chosen by a user when a selection was made. The primary element typically has distinctive handles that indicate it is the primary element. For example, the primary element might have white handles while the other elements have black ones.

```
Syntax:
    HRESULT SetPrimary
        BOOL fPrimary
    );
```

-continued

Parameters:
    fPrimary
        [in] BOOL that specifies TRUE to set the element as the primary element, or FALSE to unset it as primary.

Return Values:
Returns S_OK if successful, or an error value otherwise.
Segment Interface (ISegment)
The segment interface 616 provides a method that creates containers (segments) for fragments of HTML markup in the current editable selection. These segments can include both a range of elements and element fragments. The segment interface 616 includes a get pointers method 636 (GetPointers).
GetPointers
Description: The get pointers method 636 (GetPointers) positions markup pointers at the start and end of the selection segment.

Syntax:
    HRESULT GetPointers (
        IMarkupPointer *pIStart,
        IMarkupPointer *pIEnd
    );
Parameters:
    pIStart
        [in] Pointer to an IMarkupPointer interface that specifies the markup pointer to position at the beginning of the segment.
    pIEnd
        [in] Pointer to an IMarkupPointer interface that specifies the markup pointer to position at the end of the segment.

Return Values:
Returns S_OK if successful, or an error value otherwise.
Segment List Interface (ISegmentList)
The segment list interface 614 provides methods that access information about a list of the segments in the current selection. The segment list interface 614 includes a create iterator method 638 (CreateIterator), a get type method 640 (GetType), and an 'is empty' method 640 (IsEmpty).
CreateIterator
Description: The create iterator method 638 creates an ISegmentListIterator interface used for traversing the members of a segment list.

Syntax:
    HRESULT CreateIterator (
        ISegmentListIterator **ppIIter
    );
Parameters:
    ppIIter
        [out] Address of a pointer to a variable that receives an ISegmentListIterator interface pointer for the newly created ISegmentListIterator.

Return Values:
Returns S_OK if successful, or an error value otherwise.
GetType
Description: The get type method 640 retrieves the type of the selection.

Syntax:
    HRESULT GetType (
        SELECTION_TYPE *peType
    );

-continued

Parameters:
    peType
        [out]Pointer to a variable of type SELECTION_TYPE that receives the selection type value.

Return Values:
Returns S_OK if successful, or an error value otherwise.
IsEmpty
Description: The 'is empty' method 642 determines whether the segment list is empty.

Syntax:
    HRESULT IsEmpty (
        BOOL *pfEmpty
    );
Parameters:
    pfEmpty
        [out] Pointer to a variable of type BOOL that receives TRUE if the segment list is empty, or FALSE if it is not empty.

Return Values:
Returns S_OK if successful, or an error value otherwise.
Selection Services Listener Interface (ISelectionServicesListener)
The selection services listener interface 610 provides methods that the editing component of MSHTML calls whenever certain events fire for a selection object that has a registered ISelectionServicesListener interface. This interface provides processing for undo events, for selection type changes, and whenever the mouse pointer exits the scope of an element in the editable selection. An application should supply an implementation of this interface for a selection object so that the editing component of MSHTML can respond to these events. The selection services listener interface 610 includes a begin selection undo method (BeginSelectionUndo) 644, an end selection undo method 646 (EndSelectionUndo), a get type detail method 648 (GetTypeDetail), an 'on change type' method 650 (OnChangeType), and an 'on selected element exit' method 652 (OnSelectedElementExit). To register an ISelectionServicesListener interface for a particular selection object, the ISelectionServices::SetSelectionType method or ISelectionServices::OnChangeType method is used.
BeginSelectionUndo
Description: The begin selection undo method 644 is called by the editor 600 when an editing operation is beginning that may result in a change in selection after the editing operation. This method exists so that the designers may place their own units on an Undo queue so that a selection may be restored to its original state when the editing process was started.

Syntax:
    HRESULT BeginSelectionUndo (VOID);
Parameters:
    None.

Return Values:
Returns S_OK if successful, or an error value otherwise.
EndSelectionUndo
Description: The end selection undo method 644 is called by the editor 600 at the end of an editing operation that may result in a change in selection after the editing operation. This method exists so that the designers may place their own units on an Undo Queue so that a selection may be restored to its original state when the editing process was started.

Syntax:
HRESULT EndSelectionUndo (VOID);
Parameters:
None.
Return Values:
Returns S_OK if successful, or an error value otherwise.

GetTypeDetail

Description: The get type detail method 648 is called by MSHTML to obtain the name of the selection type. This method allows a host application to provide the name of a selection type when implementing a custom selection mechanism. MSHTML will return a value of 'undefined' if the host does not implement this method.

```
Syntax:
    HRESULT GetTypeDetail (
        BSTR *pTypeDetail
    );
Parameters:
    pTypeDetail
        [out] BSTR that specifies the name of the selection type.
```

Return Values:
Returns S_OK if successful, or an error value otherwise.

OnChangeType

Description: The 'on change type' method 650 is called by the editor 600 when the type of a selection changes. This method is used to implement custom processing that should take place when a selection is initiated or when a selection changes type.

```
Syntax:
HRESULT OnChangeType (
    SELECTION_TYPE eType,
    ISelectionServicesListerner *pIListener
);
Parameters:
    eType
        [in] SELECTION_TYPE enumeration that specified the new
        selection type.
    pIListener
        [in] Optional. Pointer to an ISelectionServicesListener
        interface to register with the new selection. Can be set to
        NULL.
```

Return Values:
Returns S_OK if successful, or an error value otherwise.

OnSelectedElementExit

Description: The 'on selected element' exit method 652 is called by the editor 600 whenever an element that intersects selection undo is removed from the document. This method exists so that the selection can be updated by the extensible editor (either removed or adjusted).

```
Syntax:
    HRESULT OnSelectedElementExit (
        IMarkupPointer *pIElementStart,
        IMarkupPointer *pIElementEnd,
        IMarkupPointer *pIElementContentStart,
        IMarkupPointer *pIElementContentEnd
    );
```

```
-continued

Parameters:
    *pIElementStart
        [in] Pointer to an IMarkupPointer interface specifying the
        point just before the element's opening tag.
    *pIElementEnd
        [in] Pointer to an IMarkupPointer interface specifying the
        point just after the element's closing tag.
    *pIElementContentStart
        [in] Pointer to an IMarkupPointer interface specifying the
        point just after the element's opening tag.
    *pIElementContentEnd
        [in] Pointer to an IMarkupPointer interface specifying the
        point just before the element's closing tag.
```

Return Values:
Returns S_OK if successful, or an error value otherwise.

Highlight Rendering Services

Highlight rendering services allows a user to modify the rendered character attributes of text without modifying the document content. This facility is critical for providing a mechanism for providing user feedback without modifying the document content. This component is critical for providing a mechanism for providing user feedback without affecting persistence, undo, etc.

Figure 7:
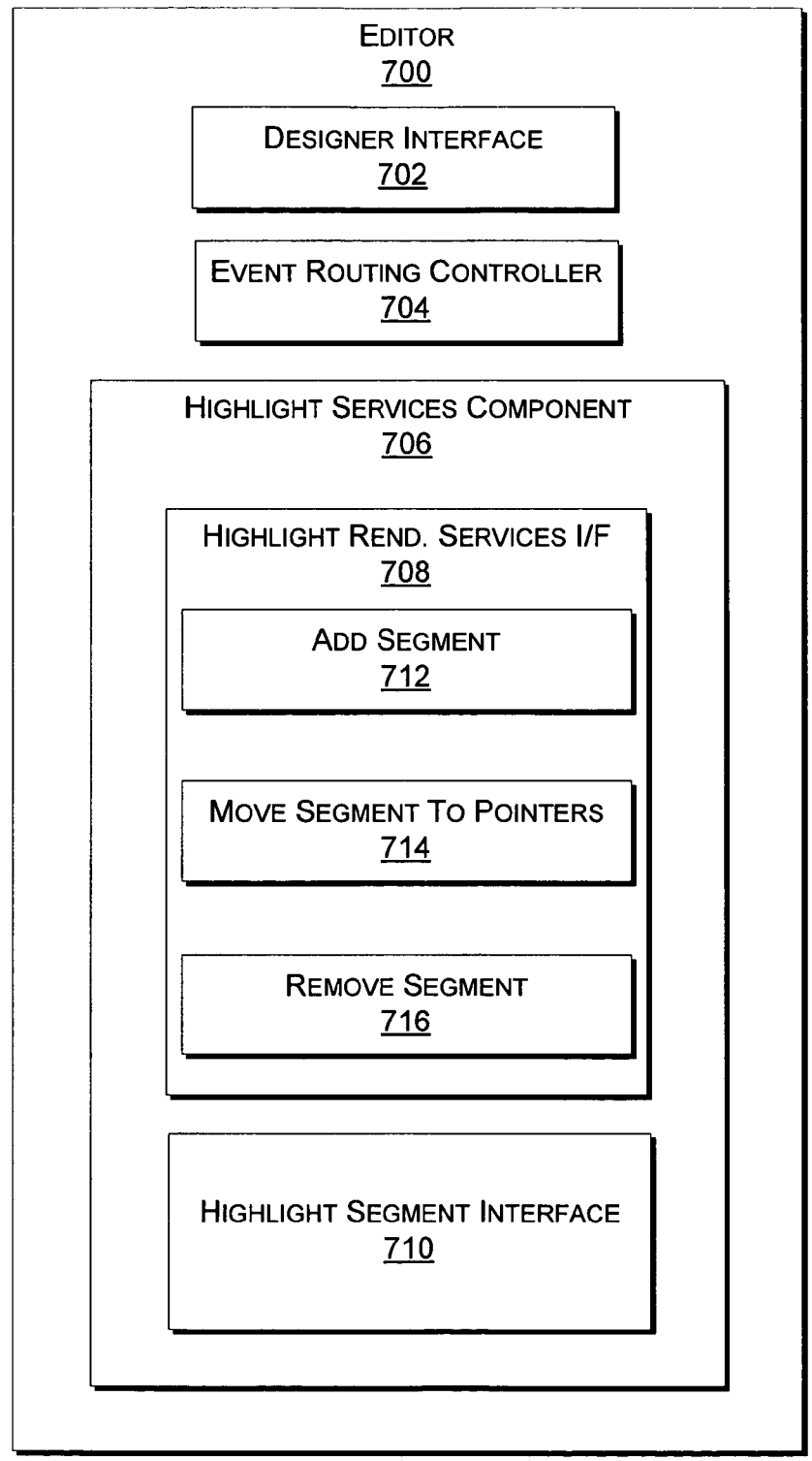
FIG. 7 is a block diagram of an editor including a highlighting services interface.

FIG. 7 is a block diagram of an extensible editor 700 that includes a designer interface 702, an event routing mechanism 704, and a highlight rendering services component 706. The highlight rendering services component 706 includes two interfaces: a highlight services interface 708 (IHighlightRenderingServices), and a highlight segment interface 710 (IHighlightSegment). These interfaces 708, 710 will be discussed in greater detail, below.

Highlight Rendering Services Interface (IHighlightRenderingServices)

The highlight rendering services interface 708 provides methods that enable a designer to control which sections of a document are highlighted on the screen and the style of highlighting. The methods include an add segment method 712 (AddSegment), a move segment to pointers method 714 (MoveSegmentToPointers), and a remove segment method 716 (RemoveSegment). The following are detailed description of the available selection services interface 608 methods.

AddSegment

Description: The add segment method 712 creates a highlight segment for the markup between two display pointers and highlights it according to a specified rendering style.

```
Syntax:
    HRESULT AddSegment (
        IDisplayPointer *pDispPointerStart,
        IDisplayPointer *pDispPointerEnd,
        IHTMLRenderStyle *pIRenderStyle,
        IHighlightSegment **ppISegment
    );
Parameters:
    pDispPointerStart
        [in] Pointer to an IDisplayPointer interface representing the
        start point of the segment to be highlighted.
    pDispPointerEnd
        [in] Pointer to an IDisplayPointer interface representing the
        end point of the segment to be highlighted.
    pIRenderStyle
        [in] Pointer to an IHTMLRenderStyle interface representing
        the style with which to render the specified segment.
    ppISegment
        [out] Address of a pointer to a variable that receives an
        IHighlightSegment interface pointer for the interface that
        represents the highlight segment between pDispPointerStart
        and pDispPointerEnd.
```

Return Values:
Returns S_OK if successful, or an error value otherwise.
MoveSegmentToPointers
Description: The move segments to pointers method 714 redefines a highlight segment and its style.

```
Syntax:
    HRESULT MoveSegmentToPointers (
        IHighlightSegment *pISegment,
        IDisplayPointer *pDispPointerStart,
        IDisplayPointer *pDispPointerEnd
    );
Parameters:
    pISegment
        [in] Pointer to an IHighlightSegment interface to redefine.
    pIDispPointerStart
        p[in] Pointer to an IDisplayPointer interface for the new start
        point of the highlight segment.
    pIDispPointerEnd
        [in] Pointer to an IDisplayPointer interface for a new endpoint
        of the highlight segment.
```

Return Values:
Returns S_OK if successful, or an error value otherwise.
RemoveSegment
Description: The remove segment method 716 removes a highlight segment from a collection of segments that are highlighted.

```
Syntax:
    HRESULT RemoveSegment (
        IHighlightSegment *pISegment
    );
Parameters:
    pISegment
        [in] Pointer to an IHighlightSegment interface to remove.
```

Return Values:
Returns S_OK if successful, or an error value otherwise.
Highlight Segment Interface (IHighlightSegment)
The highlight segment interface 710 enables a user to control a highlighted section of a document. This interface does not provide any methods of its own beyond those available from it parent interface, ISegment.
Description: The highlight segment interface 710 provides type checking for the segments added or moved from the highlighted sections through the IHighlightRenderingServices interface.
Remarks: This interface does not provide any methods of its own beyond those available from its parent interface, ISegment.

CONCLUSION

The services described above provide an applications program interface (API) for an extensible editor (MSHTML). The interfaces and the methods associated with each interface are summarized as follows:

```
IHTMLEditServices
    AddDesigner
    GetSelectionServices
    MoveToSelectionAnchor
    MoveToSelectionEnd
    RemoveDesigner
```

-continued

```
IHTMLEditDesigner
    TranslateAccelerator
    PreHandleEvent
    PostHandleEvent
    PostEditorEventNotify
ISelectionServices
    AddElementSegment
    GetMarkupContainer
    GetSelectionServicesListener
    AddSegment
    RemoveSegment
    SetSelectionType
ISelectionServicesListener
    BeginSelectionUndo
    EndSelectionUndo
    GetTypeDetail
    OnChangeType
    OnSelectedElementExit
ISegmentList
    CreateIterator
    GetType
    IsEmpty
ISegment
IElementSegment
    GetElement
    IsPrimary
    SetPrimary
IHighlightRenderingServices
    AddSegment
    MoveSegmentToPointers
    RemoveSegment
IHighlightSegment
```

The interfaces can be utilized by an extension coupled with the extensible editor to add new features to the editor, to augment existing features, or to override the editor's default behavior. Extensions can be used to modify the editor to provide customized feedback and to present a rich editing experience to a user.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. In an extensible editor having an edit designer interface comprising a pre-handle event method, the pre-handle event method comprising:
    receiving an editing event at the extensible editor, the editing event requesting manipulation of a document;
    routing the editing event to an editor extension coupled to the extensible editor before the extensible editor acts on the editing event;
    receiving notification from the editor extension indicating whether the extensible editor should continue to process the editing event after the editing event has been routed to the editor extension; and
    routing the editing event to an additional editor extension when the notification indicates that the extensible editor should continue to process the editing event, wherein an order in which the editing event is routed to the editor extension and the additional editor extension is based on an order in which the editor extension and the additional editor extension were registered with the extensible editor.

2. The method as recited in claim 1, wherein the routing an editing event to the editor extension further comprises routing an event identifier to the editor extension, the event identifier uniquely identifying an editing event.

3. The method as recited in claim 1, wherein the routing an editing event to the editor extension further comprises routing an event object interface to the editor extension, the event object interface providing the editor extension with means to process the editing event.

4. In an extensible editor having an edit designer interface comprising a post-handle event method, the post-handle event method comprising:
routing an editing event requesting manipulation of a document to an editor extension coupled to the extensible editor after the extensible editor acts on the editing event;
receiving notification from the editor extension indicating whether the extensible editor should continue to process the editing event after the editing event has been routed to the editor extension; and
routing the editing event to an additional editor extension coupled to the extensible editor when the notification indicates that the extensible editor should continue to process the editing event, wherein an order in which the editing event is routed to the editor extension and the additional editor extension is based on an order in which the editor extension and the additional editor extension were registered with the extensible editor.

5. The method as recited in claim 4, wherein the routing an editing event to the editor extension further comprises routing an event identifier to the editor extension, the event identifier uniquely identifying an editing event.

6. The method as recited in claim 4, wherein the routing an editing event to the editor extension further comprises routing an event object interface to the editor extension, the event object interface providing the editor extension with means to process the editing event.

7. A system, comprising:
a processor; and
one or more computer-readable storage media having computer-executable instructions stored thereon that, when executed by the processor, implement:
an extensible editor that processes editing events requesting manipulation of a document, the extensible editor having an event routing controller and a default event handler; and
a first extension and a second extension coupled with the extensible editor for processing the editing events, wherein the event routing controller provides an editing event received by the extensible editor to the first extension prior to providing the editing event to be processed by the default event handler, wherein the event routing controller provides the editing event to the second extension prior to providing the editing event to be processed by the default event handler when the first extension does not consume the editing event, and wherein an order in which the editing event is routed to the first extension and the second extension is based on an order in which the first extension and the second extension were registered with the extensible editor.

8. The system as recited in claim 7, wherein the event routing controller provides the editing event to the first extension after the default event handler has processed the editing event.

9. The system as recited in claim 7, wherein:
the event routing controller routes editing events to the first extension, the second extension and the default event handler; and
the first extension, the second extension and the default event handler are notified of any action taken in response to the editing event by the other extension or by the default event handler.

10. The system as recited in claim 7, wherein the event routing controller further provides an event identifier uniquely identifying the editing event.

11. The system as recited in claim 7, wherein the event routing controller provides an event object interface to the first extension to allow the first extension to access information regarding the editing event.

12. The system as recited in claim 7, wherein the extensible editor further comprises an edit designer interface that includes a pre-handle event method for providing the event to the first extension prior to the default event handler receiving the event.

13. The system as recited in claim 7, wherein:
the extensible editor further comprises an edit designer interface that includes a post-handle event method for providing the editing event to the first extension after the default event handler has processed the event; and
the event routing controller is further configured to provide the editing event to the first extension through the edit designer interface.

14. The system as recited in claim 7, wherein the extensible editor further comprises an edit designer interface that includes a post-editor event notify method that is called by the event routing controller after the editing event has been processed by the first extension, and wherein the default event handler is configured to provide data to the first extension and the second extension regarding actions taken in response to the editing event.

15. A method for processing events in an extensible editor that communicates with a first extension and a second extension, the method comprising:
sending an editing event requesting manipulation of a document to the first extension;
receiving a signal from the first extension indicating whether to continue processing the event; and
sending the editing event to the second extension when the signal indicates that processing should continue, wherein an order in which the editing event is routed to the first extension and the second extension is based on an order in which the first extension and the second extension were registered with the extensible editor.

16. The method as recited in claim 15, further comprising notifying the second extension about actions taken by the first extension in response to receiving the event if the signal indicates that the event should not be processed further.

17. The method as recited in claim 15, further comprising receiving an additional signal from the second extension indicating whether to continue processing the event, and processing the event if the additional signal indicates that processing should continue.

18. The method as recited in claim 15, further comprising:
determining if the event is a command; and
if the event is a command, translating the command and withholding the event from the first extension and the second extension.

19. The method as recited in claim 15, further comprising:

determining if the event is a command; and if the event is a command, translating the command and notifying the first extension and the second extension that the command has been processed.

20. A computer-readable storage medium having computer-executable instructions that, when executed on a computer, perform a method comprising:

detecting an editing event requesting manipulation of a document;

routing the editing event to a first designer;

receiving a response from the first designer that indicates whether the editing event was consumed by the first designer; and routing the editing event to a second designer when the response indicates that the editing event was not consumed by the first designer, wherein an order in which the editing event is routed to the first designer and the second designer is based on an order in which the first designer and the second designer were registered with an editor.

21. The computer-readable storage medium as recited in claim 20, further comprising computer-executable instructions to perform a method comprising:

receiving an additional response from the second designer that indicates whether the editing event was consumed by the second designer; and processing the editing event if the response from the second designer indicates that the editing event was not consumed by the second designer.

22. The computer-readable storage medium as recited in claim 20, further comprising computer-executable instructions to perform a method comprising:

notifying the second designer that the first designer consumed the event if the response from the first designer indicates that the first designer consumed the event.

* * * * *